D. E. BOOTH.
VULCANIZING DEVICE.
APPLICATION FILED MAR. 24, 1919.
1,317,124.
Patented Sept. 23, 1919.
2 SHEETS—SHEET 1.
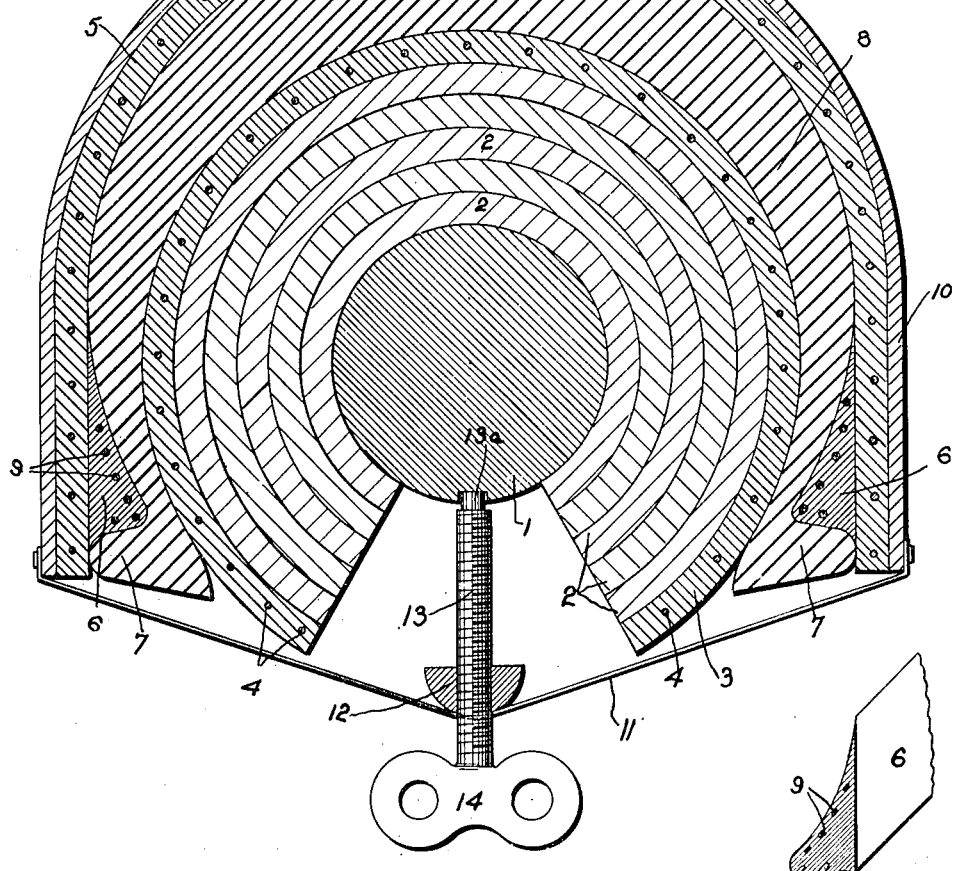
Fig. 1.
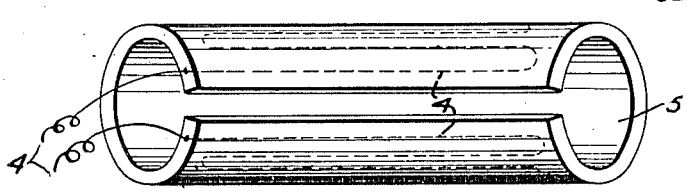
Fig. 2.
Fig. 5
WITNESSES
INVENTOR
DANA E. BOOTH
BY
ATTORNEYS

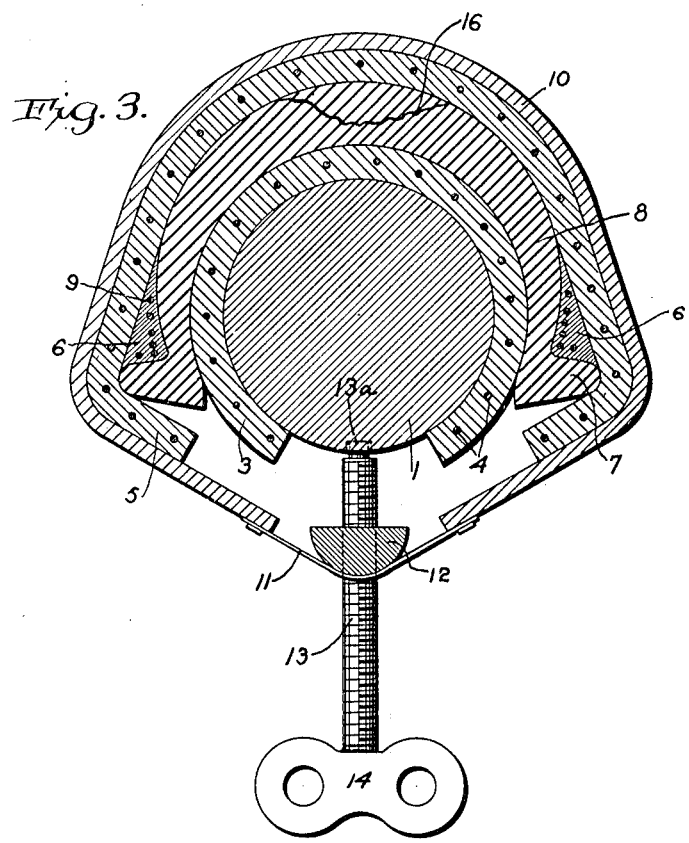
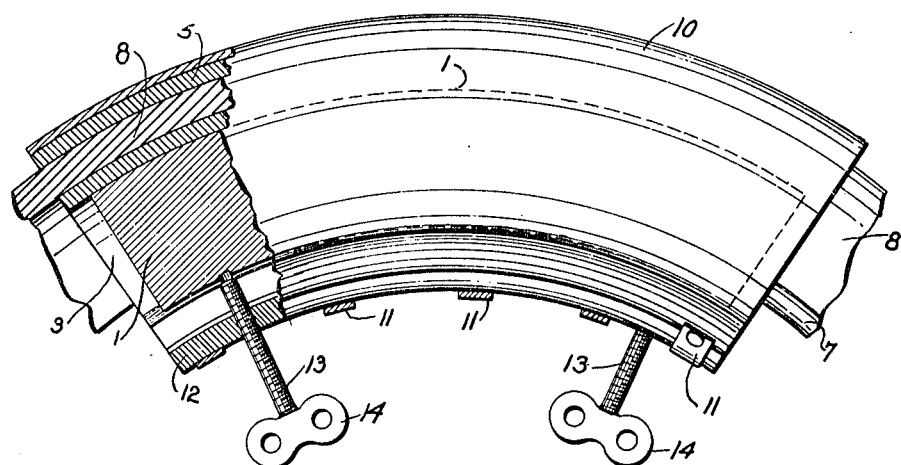

UNITED STATES PATENT OFFICE.

DANA E. BOOTH, OF TULSA, OKLAHOMA.

VULCANIZING DEVICE.

1,317,124.   Specification of Letters Patent.   Patented Sept. 23, 1919.

Application filed March 24, 1919. Serial No. 284,573.

*To all whom it may concern:*

Be it known that I, DANA E. BOOTH, a citizen of the United States, and a resident of Tulsa, county of Tulsa, and State of Oklahoma, have invented a new and Improved Vulcanizing Device, of which the following is a full, clear, and exact description.

This invention relates to vulcanizers and in particular appertains to electric pad vulcanizers for rebuilding and repairing pneumatic tires.

In conducting tire rebuilding and repairing stations and garages it is often necessary to repair tires of various diametral sizes. Thus the garage man is necessarily required to keep on hand several different sizes of tire vulcanizing equipments which is an unnecessary expense provided he can be furnished with a universal vulcanizing set adapted to use on all conventional size tires.

A purpose of this invention is to provide an electrically heated vulcanizing equipment adapted for use in repairing and rebuilding all size tires in present-day use. It is also a purpose and feature of this invention to provide the design of an electrically heated vulcanizer embodying flexible vulcanizing pads which will simultaneously heat both the inner and outer walls of the tire, and also a bead vulcanizer element adapted for close work and vulcanizing around and adjacent the bead of the tire casing.

A further purpose of the present invention is to provide a vulcanizer embodying a tire form comprising separable sections, said sections being selected and combined together for forming a vulcanizer of any desired size as above described.

With the above and other objects in view the invention has relation to a certain combination and arrangement of parts, an example of which is described in the following specification, pointed out in the appended claims and illustrated in the accompanying drawings, wherein:

Figure 1 illustrates a cross sectional view taken through the vulcanizer and tire to which it is applied.

Fig. 2 illustrates in perspective view a certain electrically heated vulcanizing pad embodied within the invention.

Fig. 3 shows a cross sectional view of a vulcanizer applied to a tire of smaller diameter than that tire illustrated in Fig. 1.

Fig. 4 illustrates the vulcanizer mounted upon a tire casing, a portion of the vulcanizing equipment being broken away for clearness in illustration.

Fig. 5 illustrates a certain tire bead vulcanizer element used in connection with this electrical vulcanizing set.

Referring now more in particular to the drawings, wherein the same parts throughout the several views are designated by like reference characters, the numeral 1 points out a cylindrical tire form preferably built of fabric or of any other suitable material adapted to withstand the pressure and temperatures to which this vulcanizer is subjected. The tire form will be manufactured of any suitable length, say about twelve to eighteen inches in length, owing to the class of vulcanizing to be done. The form will assume arcuate shape to fit the contour of the conventional tire. A plurality of filler sections 2 are provided, and constructed of several diameters increasing in stages from the smaller one illustrated as mounted on the form 1 up to the larger filler section comprising the outer and last shown filler in Fig. 1. These sections are placed one upon the other in telescoping form and so constructed as to be quickly and conveniently assembled one upon the other and finally mounted upon the form 1. The sections are cut away on the inner side thereof for the purpose of admitting other parts of the vulcanizer as hereinafter described. The member 1 in connection with the several associate sections 2 comprises a very rigid and strong tire form for supporting and maintaining the shape and size of the tire while it is being vulcanized. The filler sections are preferably to be manufactured with thicknesses of approximately one-fourth inch, but any thickness of wall section can be built under the claims of this patent.

A heating pad comprising flexible and non-inflammable material 3 is placed upon the tire form, or upon the assembled sections of the tire form. Electrical heating means 4 are built into this inner heating pad for raising the heating pad to appropriate vulcanizing temperature. The electrical wires 4 are embedded within the heating pad in any suitable manner, and the terminals thereof brought out the end of the pad, as indicated in Fig. 2. The terminals 4 of the heating circuit will be attached to any suitable form of electrical fixture or plug for connection with a light or power circuit. This fixture is not shown since it does not directly bear upon the operation of my invention.

An outer heating pad 5 is employed for vulcanizing the outer wall of the tire. This pad is similarly constructed to the inner heating pad, and is provided with the same circuit and vulcanizing means. A bead vulcanizing element 6 is provided and inserted between the outer heating pad and the tire to be vulcanized adjacent the bead 7 of the casing or tire 8. This bead vulcanizing element 6 is built of flexible material similar to the heating pads hereinbefore described and has substantially a triangular cross section which adapts it to fit within the portion of the casing where the bead and the body of the casing join. Electrical circuit wires 9 are incased within the bead vulcanizer and connect with some appropriate form of electrical fixture for drawing current and heating the bead vulcanizer, as previously described, and similar to the heating pads.

A tire boot 10 is applied to the outer face of the heating pad 5. This member 10 will be constructed of heavy fabric or other suitably flexible material and will engage the outer pad 5 and tightly compress said pad against the tire to be vulcanized. This boot has fixed to its edges draw-straps or lacing cords 11. These lacing cords or straps pass over a tension bar 12. The tension bar is provided with screw threaded adjusting members 13 fitted with a winged head 14. The screw threaded member is decreased in size on the working end and confined in a shallow bore 13$^a$ cut into the tire form 1. The screw threaded member, therefore, supports the tension bar in spaced relation from the tire form. By screwing down on the screw threaded appliance the tension bar is forced away from the form which draws upon the straps or cords 11 placing them under high tension which draws the tire boot under compression around the tire face and the heating pad 5. The tire boot with associate tension bar and adjustable screw thread members form a pressure device capable of placing the tire form and heating pads under great vulcanizing pressure against the inner and outer walls of the tire.

The several current carrying circuits herein illustrated will be connected up in common to any suitable source of current for heating the disclosed vulcanizer. A rheostat current regulator may be employed and any other electrical equipment necessary for constructing an efficient vulcanizing apparatus along the principles herein described.

In assembling the vulcanizer upon a tire casing the form 1 and enough filler sections 2 will be employed such that the inner diameter of the tire will be filled. The heating pad 5 will be placed between the tire form and the casing, and the outer heating pad will be placed upon the outer face of the casing and under the tire boot, as previously described. The whole assembly will then be placed under compression by the pressure device, and heat applied thereto until the tire is effectually vulcanized.

Within the drawings I have illustrated a break or rupture 16 indicating a place in the casing to be repaired. This form of vulcanizer will render it unnecessary to keep on hand several different sizes of equipment for repairing tires, and it is pointed out that the vulcanizing operation is effected on both the outer and inner walls at the same time.

Having thus described my invention, what I claim as new, and desire to secure by Letters Patent is:

1. An electric pad vulcanizer for pneumatic tires, comprising an electric heating pad disposed upon each side of the tire, a tire form, a plurality of telescoping filler sections for enlarging the tire form, and a pressure boot coöperating with the tire form for bringing the heating pads into engagement with the tire.

2. An electric pad vulcanizer for pneumatic tires, comprising an electric heating pad disposed upon each side of the tire, a tire form, a plurality of telescoping filler sections for enlarging the tire form, and a pressure boot coöperating with the tire form for bringing the heating pads into engagement with the tire, and means for placing the boot under compression by drawing it tightly about the tire to be vulcanized.

3. An electric vulcanizer for pneumatic tires comprising in combination, a tire form for supporting and holding to shape a tire to be vulcanized, a heating pad interposed between the form and the tire, a bead vulcanizer strip with a plurality of current conductors therein employed along the bead of the tire, and means employed to press the heating pad and bead vulcanizer strip tightly against the tire.

4. An electric vulcanizer for pneumatic tires comprising in combination, a tire form for supporting and holding to shape a tire to be vulcanized, a plurality of telescoping filler sections adapted to be placed on the tire form for filling out the size of said form to any conventional tire size, a heating pad interposed between the form and the tire, a bead vulcanizer applied along the bead of the tire, and means employed to press the heating pad and bead vulcanizer tightly against the tire.

5. A pneumatic tire vulcanizer comprising in combination, a tire form, a plurality of filler sections for building up the diametral size of said form, a heating pad supported upon the aforesaid tire form and filler sections and adapted to lay in contact with the inner wall of a tire, a tire bead vulcanizer adapted to fit and conform to the bead of a tire, an outer heating pad, and means employed for bringing all aforesaid elements into compression with a tire to be vulcanized.

6. A pneumatic tire vulcanizer, comprising in combination, a tire form, a plurality of filler sections for building up the diametral size of said form, a heating pad supported upon the aforesaid tire form and filler sections and adapted to lay in contact with the inner wall of a tire, and a tire bead vulcanizer element comprising a heated section of flexible material conforming to the contour of the bead and wall of a pneumatic tire.

7. A pneumatic tire vulcanizer, comprising in combination, a tire form, a plurality of filler sections for building up the diametral size of said form, a heating pad supported upon the aforesaid tire form and filler sections and adapted to lay in contact with the inner wall of a tire, and a tire bead vulcanizer element comprising a heated section of flexible material conforming to the contour of the bead and wall of a pneumatic tire, and a tire boot placed upon the outer wall of the tire to be vulcanized, and a tension bar connected with the tire boot and cooperating with the tire form such that when the form and bar are forced in direction apart one from another the heating pad and tire bead vulcanizer will compress against the tire for vulcanizing and curing said tire.

8. A vulcanizer for tires, embodying in combination, a plurality of filler sections comprising cylindrical telescoping arcuate members with cut-away portions said members being furnished in increasing diametral stages such that variable size tire forms can be built up by selection of sections, and vulcanizing means used in connecting with the aforesaid variable size tire form for vulcanizing tires.

DANA E. BOOTH.